US008813657B2

(12) United States Patent
Winter et al.

(10) Patent No.: US 8,813,657 B2
(45) Date of Patent: Aug. 26, 2014

(54) ARRANGEMENT OF A TABLE THAT CAN BE FOLDED UP

(75) Inventors: Joachim Winter, Hettenleidelheim (DE); Harald Klein, Matzenbach (DE); Frank Wenz, Erzenhausen (DE)

(73) Assignee: Johnson Controls Technology Company, Holland, MI (US)

( * ) Notice: Subject to any disclaimer, the term of this patent is extended or adjusted under 35 U.S.C. 154(b) by 84 days.

(21) Appl. No.: 13/579,091

(22) PCT Filed: Feb. 16, 2011

(86) PCT No.: PCT/EP2011/000745
§ 371 (c)(1),
(2), (4) Date: Aug. 15, 2012

(87) PCT Pub. No.: WO2011/103980
PCT Pub. Date: Sep. 1, 2011

(65) Prior Publication Data
US 2012/0306241 A1    Dec. 6, 2012

(30) Foreign Application Priority Data
Feb. 23, 2010   (DE) .......................... 10 2010 009 526

(51) Int. Cl.
*A47B 23/00*   (2006.01)
*B60N 2/46*   (2006.01)
*B60N 3/00*   (2006.01)

(52) U.S. Cl.
CPC ................ *B60N 3/002* (2013.01); *B60N 2/468* (2013.01); *B60N 2/4633* (2013.01)
USPC ............................................ 108/44; 297/145

(58) Field of Classification Search
USPC ......... 108/44, 45; 297/163, 145, 144, 188.16, 297/188.17
See application file for complete search history.

(56) References Cited

U.S. PATENT DOCUMENTS 3,583,760 A * 6/1971 McGregor .................... 297/145
3,632,161 A * 1/1972 Arfaras et al. ................ 297/145

(Continued)

FOREIGN PATENT DOCUMENTS

CH        684331 A5    8/1994
DE     2316903 A1   10/1973

(Continued)

OTHER PUBLICATIONS

International Search Report mailed Sep. 7, 2012.

(Continued)

*Primary Examiner* — Jose V Chen
(74) *Attorney, Agent, or Firm* — Fletcher Yoder, P.C.

(57) ABSTRACT

A table can be folded in the interior of a motor vehicle and comprises a table top arranged on a vehicle-mounted support so that the table top can be moved from a resting position, in which the table plane is oriented substantially vertically, into a usage position oriented substantially horizontally. The support extends in the longitudinal direction of the vehicle and the table top is fastened to the support so the table top can be pivoted by a table top retainer from the vertical resting position into a horizontal position about a pivot axis in the longitudinal direction of the vehicle. The table top and/or the table top retainer can be locked in the usage position by a locking device when the table top is in the horizontal position and/or in the vertical position. When the table top is in the horizontal position and/or in the vertical position, the table top retainer is supported so that it can be moved in or opposite the direction of travel to lock the table top retainer into a catch recess of the support that extends in or opposite the direction of travel, and the retainer is secured against pivoting about the first pivot axis.

18 Claims, 7 Drawing Sheets

(56) References Cited

U.S. PATENT DOCUMENTS

Figure 1:
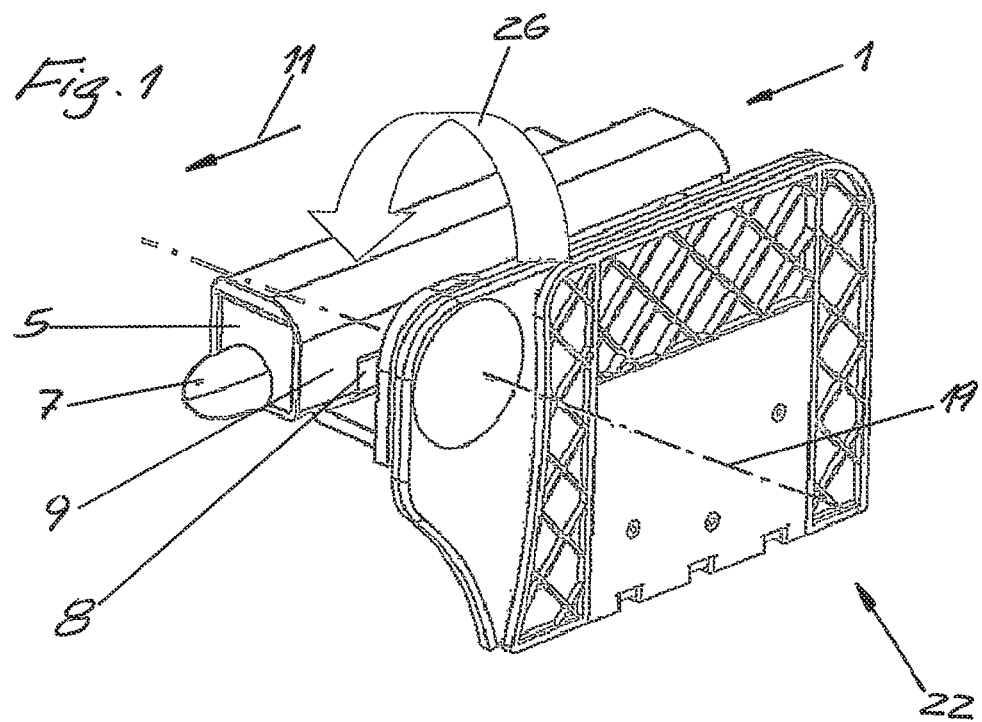

| | | | |
|---|---|---|---|
| 4,372,604 A | | 2/1983 | Raksanyi et al. |
| 4,779,884 A | * | 10/1988 | Minati .................. 297/155 |
| 4,944,552 A | * | 7/1990 | Harris .................. 297/145 |
| 5,333,929 A | * | 8/1994 | Slagerman ............ 297/155 |
| 5,547,247 A | * | 8/1996 | Dixon .................. 297/145 |
| 5,996,954 A | * | 12/1999 | Rosen et al. ........... D14/239 |
| 6,220,658 B1 | * | 4/2001 | Lukawski et al. ...... 297/145 |
| 6,347,590 B1 | * | 2/2002 | D'Annunzio et al. ... 108/44 |
| 7,478,868 B2 | * | 1/2009 | Figueras Mitjans .... 297/145 |
| 8,359,982 B2 | * | 1/2013 | Lebel et al. ........... 108/44 |
| 8,448,581 B2 | * | 5/2013 | Hanna et al. .......... 108/44 |
| 2008/0277991 A1 | | 11/2008 | Liu et al. |
| 2011/0067606 A1 | * | 3/2011 | Sundarrao ............. 108/44 |

FOREIGN PATENT DOCUMENTS

| | | |
|---|---|---|
| DE | 10044414 A1 | 3/2002 |
| DE | 10114837 A1 | 10/2002 |
| DE | 10230643 A1 | 2/2004 |
| DE | 20320522 U1 | 10/2004 |
| DE | 10327704 A1 | 1/2005 |
| DE | 102006043483 A1 | 3/2008 |
| DE | 102007050967 A1 | 4/2009 |
| FR | 755261 A | 11/1933 |

OTHER PUBLICATIONS

International Search Report of PCT Application No. PCT/ER2011/000745 mailed Apr. 13, 2011.

* cited by examiner

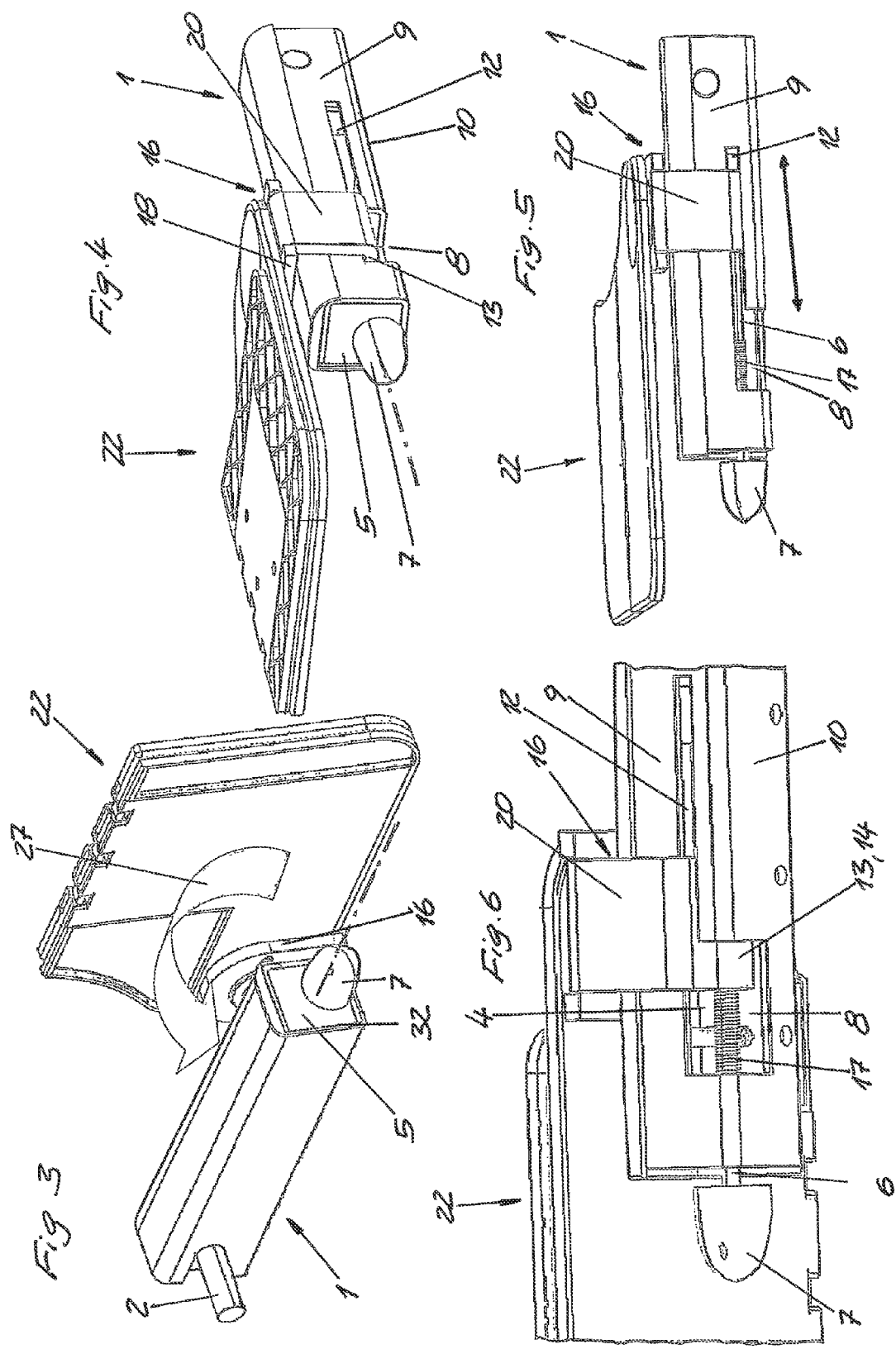

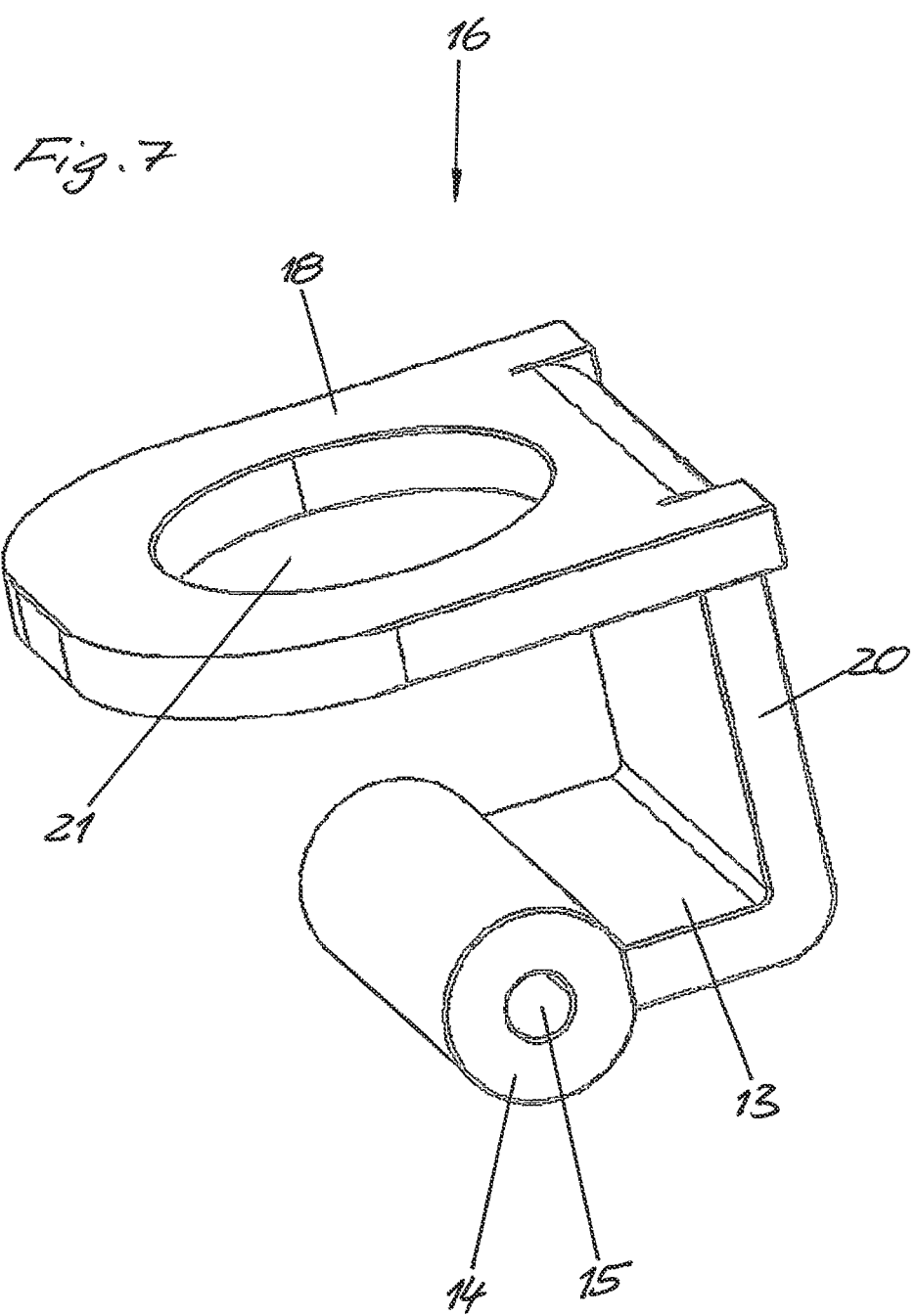

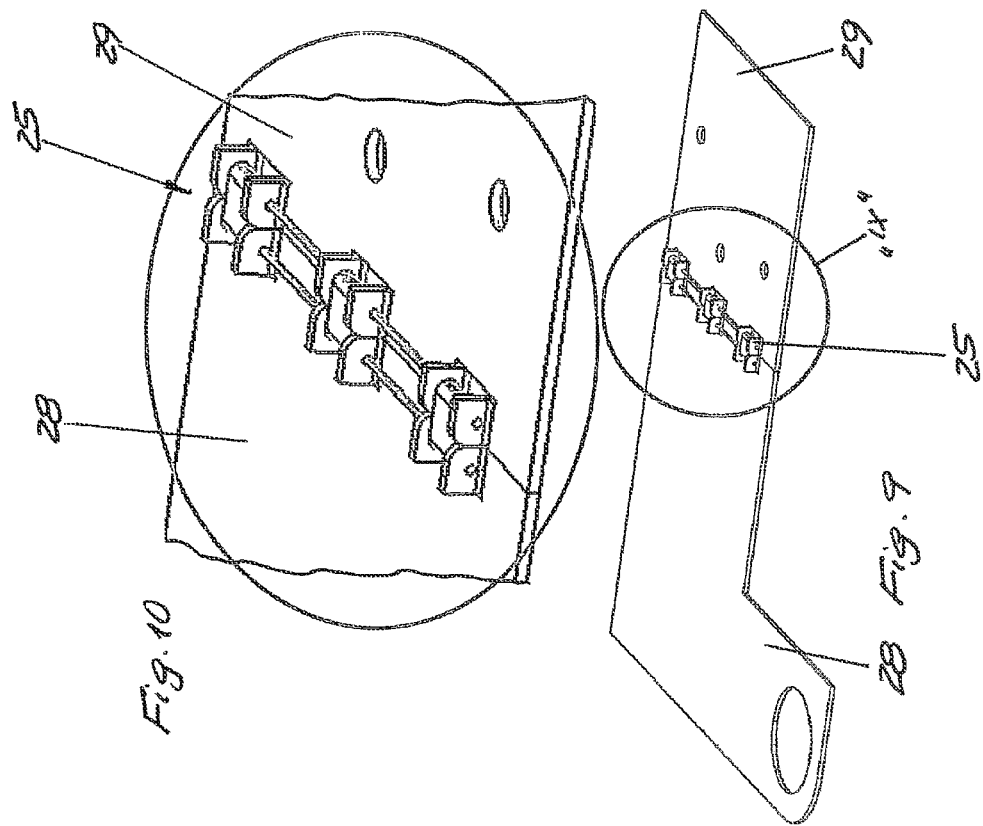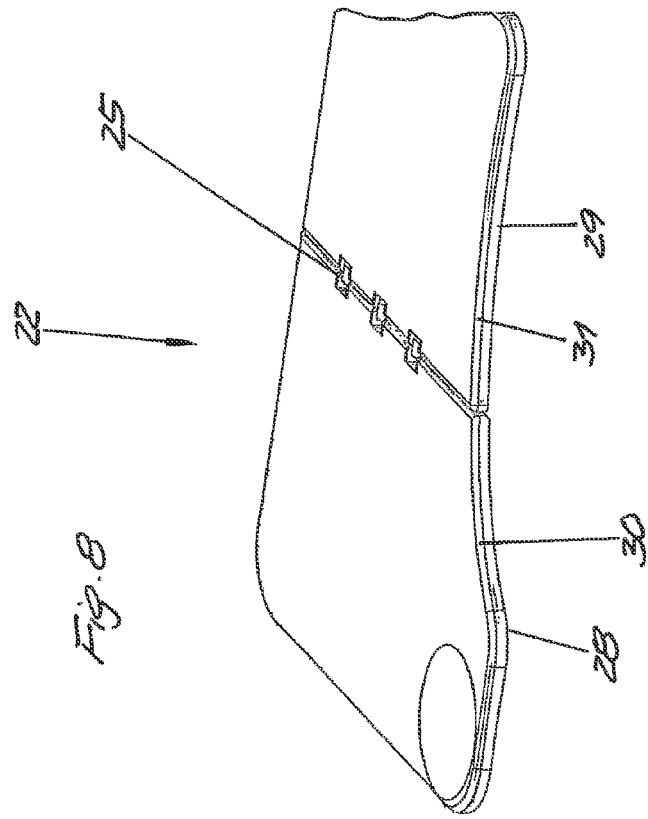

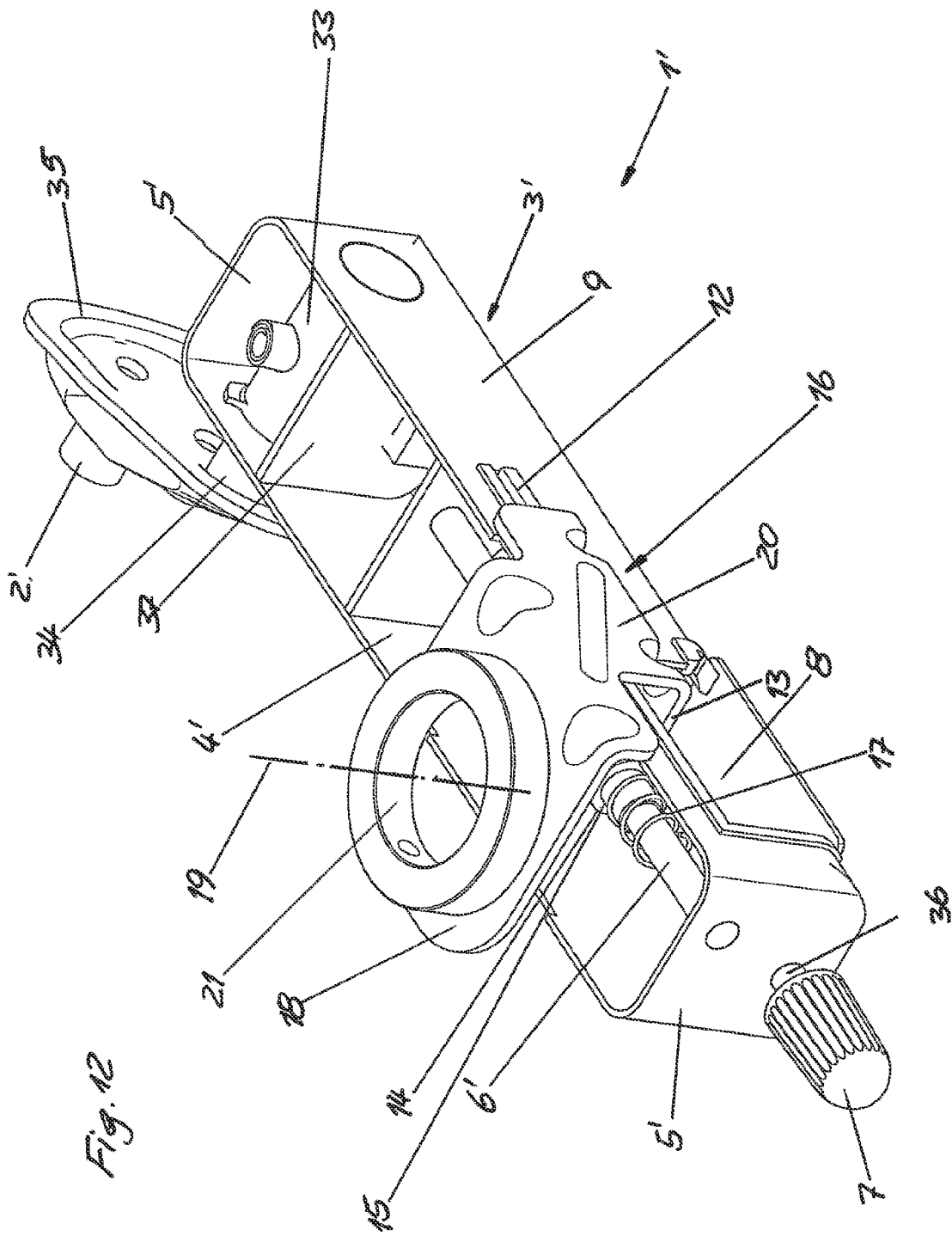

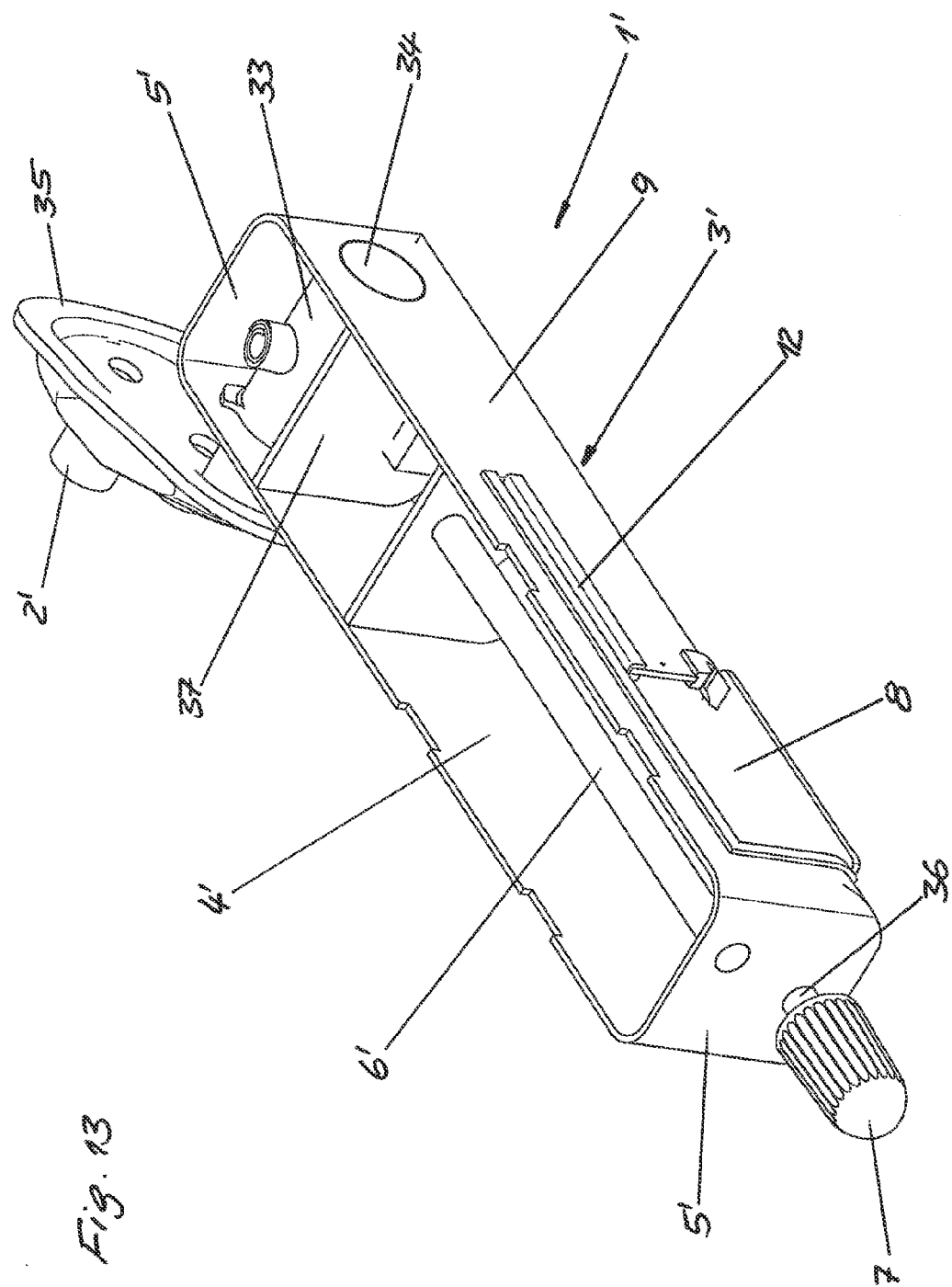

ARRANGEMENT OF A TABLE THAT CAN BE FOLDED UP

CROSS REFERENCE TO RELATED APPLICATIONS

This application claims priority from and the benefit of PCT Application No. PCT/EP2011/000745, filed on Feb. 16, 2011 and German Patent DE 10 2010 009 526.5, filed on Feb. 25, 2010; all entitled "Arrangement of a Table that can be Folded Up", which are herein incorporated by reference.

BACKGROUND

The invention relates to an arrangement of a collapsible table in the interior of a motor vehicle, having a table top, which is arranged on a vehicle-mounted carrier such that it can be transferred from a rest position, with an essentially vertically oriented table plane, into an essentially horizontally oriented, use position, wherein the carrier extends in the longitudinal direction of the vehicle and the table top is fastened on the carrier by means of a table-top holder such that it can be pivoted, about a pivot axis extending in the longitudinal direction of the vehicle, out of its vertical, rest position into a horizontal position, and wherein the table top and/or the table-top holder can be arrested in the use position by means of an arresting device, which is a latching device into which, with the table top located in the horizontal position and/or in the vertical position, the table-top holder can be latched.

DE 101 14 837 A1 and DE 102 30 643 A1 disclose an arrangement of a collapsible table which corresponds largely to the type mentioned in the introduction.

DE 100 44 414 A1 discloses an arrangement of a collapsible table which is arranged above a supporting panel on a pull-out carrying arm. In the pulled-out state, the table, which comprises two panel elements, can be swung open transversely to the longitudinal direction of the vehicle. There is no arresting device present.

DE 10 2006 043 483 A1 discloses an aircraft-seat mechanism with a table which is arranged on a multiple-pull-out-mechanism arm such that it can be pivoted out of a vertically upwardly directed, rest position into a horizontal, use position. This arrangement can be fixed by latching means in the various carrying positions.

SUMMARY

It is an object of the invention to provide an arrangement of the type mentioned in the introduction in the case of which the table can be stored in a space-saving manner in its rest position and has a straightforward and stable construction.

This object is achieved according to the invention in that the table-top holder, with the table top located in a horizontal position and/or in a vertical position, is mounted in a displaceable manner in or counter to the direction of travel such that it can be latched into a latching recess of the carrier, this recess extending in or counter to the direction of travel, and is secured against pivoting about the first pivot axis.

The vertical arrangement in the rest position means that only a small amount of space is required for accommodating the table top.

In its use position, the table top is secured in a stable manner since it is fixed not just via the pivot axis but, in addition, also by the arresting device.

Biasing the table-top holder in the latching-in direction into the latching recess means that, once the table top has been swung into its horizontal orientation, the table top is automatically fixed in the use position.

The table top is also secured in the rest position in that the table top and/or the table-top holder can be arrested in the rest position by means of an arresting mechanism.

It is possible for the table-top holder to have a bearing lug with a bearing bore extending in the longitudinal direction of the vehicle and to be mounted, by way of the bearing bore, such that it can be pivoted on a bearing spindle, which extends coaxially to the pivot axis and is arranged on the carrier.

This design allows the bearing spindle to be arranged at a fixed location, which results in stabilization of the table top located in the use position, and therefore this table top can also be subjected to relatively high loading.

If a helical compression spring here wraps around the bearing spindle with play, wherein the helical compression spring has its one end supported on the carrier and has its other end prestressed in abutment against the table-top holder, biasing the latter in the latching-in direction into the latching recess, then only a small amount of installation space is necessary.

A further reduction in the amount of installation space necessary is achieved by the carrier being designed in the manner of a tube with an inner recess, wherein the bearing spindle extends coaxially through the inner recess and the table-top holder has its bearing lug projecting through a radial opening into the inner recess of the carrier.

A straightforward construction and low weight are achieved here if the carrier is designed as a sheet-metal part bent in the form of a U or as a quadrilateral tube. These two structural forms, inter alia, will be referred to hereinbelow as tubular.

If, furthermore, the latching recess is a latching slot which extends from the radial opening of the carrier in or counter to the direction of travel, then the table top is secured, in addition, against tilting away laterally.

Furthermore, the table top may be mounted on the table-top holder such that it can be rotated about a table-top axis of rotation extending at right angles to the plane of the table top.

It is thus possible for the table top, while maintaining its stability, to be pivoted with a large degree of freedom into various positions, in particular also into a position in front of the carrier, as seen in the direction of travel.

In order to achieve, in the use position, a large bearing surface area for the table top while, at the same time, only a small amount of stowage space is required in the rest position, it is possible for the table top to comprise two table sub-tops, wherein a first table sub-top is arranged on the table-top holder and is connected along a longitudinal edge, by means of a hinge, to a longitudinal edge of the second table sub-top.

If the carrier is an armrest, then this results, with a double function, in only a small amount of installation space being required.

The armrest here may be arranged on a seat of the motor vehicle.

If the armrest is arranged between the driver's seat and the passenger seat, then the table top can be used both by the driver and by the passenger.

It is possible for the armrest to have its rear end region, as seen in the direction of travel, arranged on a backrest of a vehicle seat such that it can be pivoted about an armrest spindle extending at right angles to the longitudinal extent of the armrest.

If an inclination-adjusting shaft, which is mounted in a rotatable, but axially non-displaceable manner, extends axially through the inner recess of the armrest, projects outward at the front end of the armrest, as seen in the direction of travel, and carries a rotary knob, wherein the inclination-adjusting shaft, at its other end, is provided with an external thread which engages in an inclination-adjusting device for adjusting the inclination, in the direction of travel, of the armrest, then the inclination of the armrest can be adjusted by manual rotation of the rotary knob. It is thus possible, upon adjustment of the inclination of the backrest, for the armrest, which is articulated thereon, to be moved into a horizontal orientation, and therefore the table, which is fitted on the armrest, can also be oriented horizontally.

It is possible here for the bearing spindle and the inclination-adjusting shaft to extend parallel to one another through the inner recess of the armrest.

In a manner which reduces the number of components and the amount of installation space required, however, it is also possible for the bearing spindle and inclination-adjusting shaft to form a single component, which performs the double function of the bearing spindle and inclination-adjusting shaft.

DRAWINGS

Figure 2:
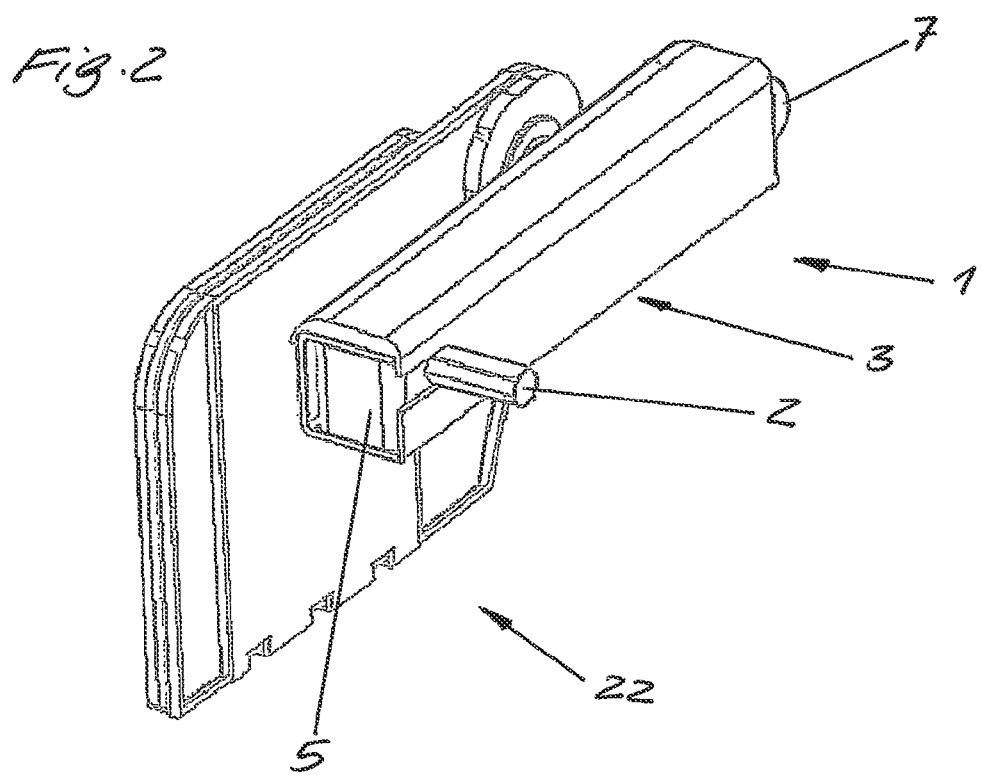
Figure 11:
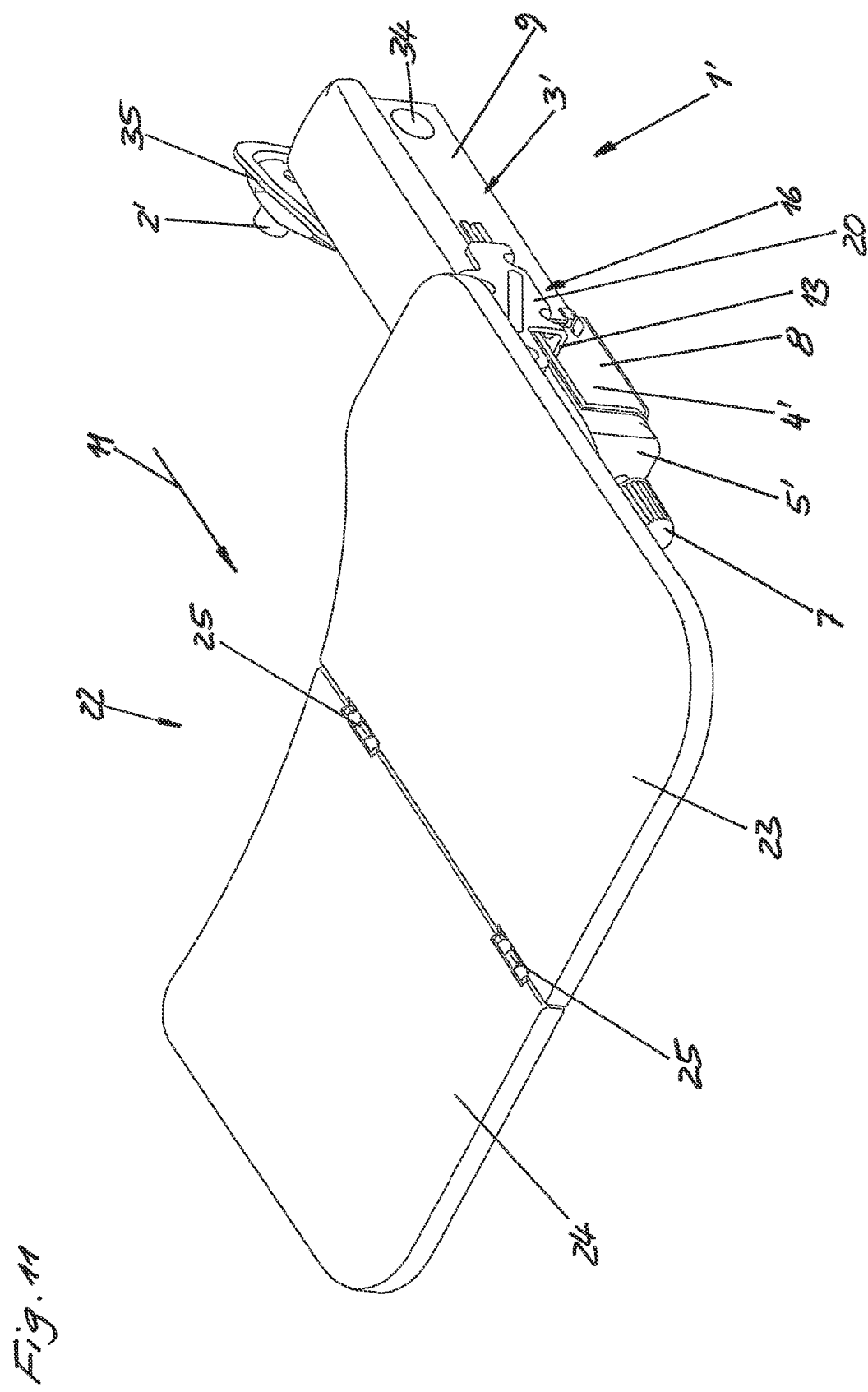

An exemplary embodiment of the invention will be described in more detail hereinbelow and is illustrated in the drawing, in which:

FIG. 1 shows a first perspective view of a first exemplary embodiment of an arrangement of a collapsible table in the rest position, FIG. 2 shows a second perspective view of the arrangement according to FIG. 1 in the rest position, FIG. 3 shows a perspective view of the arrangement according to FIG. 1 in an intermediate position, FIG. 4 shows a perspective view of the arrangement according to FIG. 1 in a use position with the table top swung closed, FIG. 5 shows a perspective view of the arrangement according to FIG. 1 in the use position with the table top swung open, FIG. 6 shows a detail of a perspective view of the bottom of the arrangement according to FIG. 1 in the rest position, FIG. 7 shows a perspective view of a table-top holder of the arrangement according to FIG. 1, FIG. 8 shows a perspective view of the table top of the arrangement according to FIG. 1, FIG. 9 shows a perspective view of a basic-panel arrangement of the table top according to FIG. 8, FIG. 10 shows an enlarged detail "IX" of the basic-panel arrangement according to FIG. 9, FIG. 11 shows a perspective view of a second exemplary embodiment of an arrangement of a collapsible table in a use position with the table top swung open, FIG. 12 shows a perspective view of an armrest of the arrangement according to FIG. 11 with a table-top holder, and FIG. 13 shows a perspective view of the armrest according to FIG. 12 without a table-top holder.

DETAILED DESCRIPTION

The illustrated arrangement of a collapsible table has a carrier which is designed as an armrest 1, 1'.

The armrest 1, 1' can preferably be arranged between a driver's seat and a passenger seat of a motor vehicle and extends in the longitudinal direction of the vehicle.

At its rear end region, as seen in the direction of travel 11, the armrest 1 of FIGS. 1 to 10 has an armrest spindle 2 which extends at right angles to the longitudinal extent of the armrest 1 and by means of which the armrest 1 is arranged such that it can be pivoted on a backrest (not illustrated) of the passenger seat.

The armrest 1 has a sheet-metal part 3 which is bent in the form of a U, is closed on its open side by a covering plate 32 and has an axially continuous inner recess 4, which is closed at its two ends by closure pieces 5. The front closure piece 5, here, as seen in the direction of travel, is formed by a bent-over part of the sheet-metal part 3 bent in the form of a U.

In FIGS. 11 to 13, the armrest 1' is formed by a sheet-metal part 3' which is bent in the form of a U, has an axially continuous recess 4' and is closed at its axial ends by integral closure pieces 5'.

An inclination-adjusting device 33 is arranged in the rear end region of the armrest 1', as seen in the direction of travel 11. By means of the inclination-adjusting device 33, the armrest 1' can be adjusted in inclination in the direction of travel about an inclination-adjusting spindle 34 extending at right angles to the armrest 1'.

The inclination-adjusting spindle 34 projects out of the armrest 1' and is connected to a plate 35 which, in turn, is arranged pivotably on a backrest (not illustrated) of the passenger seat such that it can be pivoted via an armrest spindle 2', which is parallel to the inclination-adjusting spindle 34.

Instead of the sheet-metal part 3 which is bent in the form of a U, and has the covering plate 32, it is also possible to use a quadrilateral tube.

In FIGS. 1 to 10, a bearing spindle 6, which forms an inclination-adjusting shaft at the same time, projects coaxially through the inner recess 4 and is mounted in a rotatable, but axially non-displaceable, manner in the two closure pieces 5.

In FIGS. 11 to 13, a bearing spindle 6' and an inclination-adjusting shaft 36 project axially, parallel to one another, through the inner recess 4'. The bearing spindle 6' here has its one end fixed on the front closure piece 5' and has its rear end fixed on an intermediate wall 36.

The inclination-adjusting shaft 36 is mounted in a rotatable manner in the front closure piece 5' and has its externally threaded rear end region projecting into the inclination-adjusting device 33.

The bearing spindle 6 or the inclination-adjusting shaft 36 projects outward at the front closure piece 5, as seen in the direction of travel 11, through a continuous bearing bore and carries, at this free end, a rotary knob 7, by means of which the bearing spindle 6 or the inclination-adjusting shaft 36 can be rotated.

At its other end, the bearing spindle 6, like the inclination-adjusting shaft 36, is provided with an external thread.

Manual rotation of the rotary knob 7, and thus of the bearing spindle 6 or of the inclination-adjusting shaft 36, makes it possible to actuate the inclination-setting and/or length-setting mechanism 33 of known type (not illustrated in FIGS. 1 to 10), as a result of which it is possible to set, in particular, the inclination of the armrest 1.

It is thus possible, upon adjustment of the inclination of the backrest, for the armrest 1, which is articulated thereon, to be moved into a horizontal orientation, and therefore a table, which is fitted on the armrest 1, can also be oriented horizontally.

In the case of both exemplary embodiments, the one side wall 9 of the sheet-metal part 3 bent in the form of a U contains a rectangular radial opening 8 extending from the side wall 9 into the base wall 10 of the sheet-metal part 3 bent in the form of a U.

In continuation of the upper edge of the radial opening 8, a latching slot 12 extends into the side wall 9 counter to the direction of travel 11.

An arm 13 of a table-top holder 16, this consisting of a flat material bent approximately in the form of a U, projects through the radial opening 8.

A bearing lug 14 with a continuous bearing bore 15 is arranged at that end of the arm 13 which projects into the inner recess 4 of the sheet-metal part 3 bent in the form of a U, the table-top holder 16 being guided in a pivotable and displaceable manner on the bearing spindle 6 by means of this bearing bore.

The pivotability of the table-top holder 16 means that the arm 13 thereof can be pivoted between a position in which it projects horizontally to the side and a position in which it projects vertically downward.

With the arm 13 located in the horizontal position, it can be moved, by axial displacement of the table-top holder 16, into the latching slot 12, as a result of which the table-top holder 16 is secured against pivoting in the use position.

This movement into the latching slot 12 takes place automatically and by way of a prestressed helical compression spring 17 which wraps around the bearing spindle 6 with play and has its one end supported on the front closure piece 5, as seen in the direction travel 11, and has its other end supported on the bearing lug 14 of the table-top holder 16.

In continuation of the lower edge of the radial opening 8, a second latching slot (not illustrated) extends into the base wall 10 counter to the direction of travel 11. With the arm 13 located in the vertical position, it can be moved, by axial displacement of the table-top holder 16, into the second latching slot, as a result of which the table-top holder 16 is secured against pivoting in the rest position. The movement into the second latching slot also takes place by way of the helical compression spring 17.

As an alternative, it is also conceivable for the latching slot 12 and the second latching slot (not illustrated) to be arranged to extend in the direction of travel 11. In this case, the helical compression spring 17 should be arranged such that it forces the table-top holder 16 in the direction of travel.

The second arm 18 of the table-top holder 16, this second arm being parallel to the arm 13, has a second bearing bore 21, which is directed parallel to the base part 20 of the table-top holder 16, this base part connecting the arm 13 and the second arm 18, and in which a table top 22, which rests on the second arm 18 and is connected thereto, is mounted such that it can be rotated about a table-top axis of rotation 19.

The table top 22 comprises two table sub-tops 23 and 24, wherein the first table sub-top 23 is connected along a longitudinal edge, by means of a hinge 25, to a longitudinal edge of the second table sub-top 24 such that the second table sub-top 24 can be pivoted out of a collapsed position, in which it butts with surface contact against the first table sub-top 23, into a swung-open position, in which it is pivoted through 90°.

The second bearing bore 21 is located, in FIGS. 1 to 10, in a corner of that region of the first table sub-top 23 which is directed away from the hinge 25.

In FIGS. 11 to 13, the second bearing bore (not illustrated) is located in the central peripheral region of the first table sub-top 23.

The two table sub-tops 23 and 24 comprise basic panels 28 and 29 which are made of metal and are connected to one another by the hinge 25.

On the side which is directed upward in the use position, the basic panels 28 and 29 are covered by cover panels 30 and 31 made of a plastics material.

In the rest position of the arrangement, this position being illustrated in FIG. 1, the table top 22 is collapsed and oriented vertically parallel to the armrest 1.

For transfer into the use position, the table top 22 is pivoted forward, in the first instance corresponding to the arrow 26 in FIG. 1, about the axis of the second bearing board 21 into the position which is illustrated in FIG. 3.

Pivoting then takes place about the bearing spindle 6, corresponding to the arrow 27 in FIG. 3, until the table top 22 has its table plane oriented horizontally (FIGS. 4 and 6).

The force of the helical compression spring 17 then causes the table-top holder 16 to be moved, by way of its arm 13, into the latching slot 12 (FIG. 5).

All that is then required is for the two table sub-tops 23 and 24 to be swung open, and the arrangement is located in its use position (FIG. 11).

The invention claimed is:

1. An arrangement of a collapsible table in the interior of a motor vehicle, comprising a table top arranged on a vehicle-mounted carrier such that it can be transferred from a rest position, with an essentially vertically oriented table plane, into an essentially horizontally oriented, use position, wherein the carrier extends in a longitudinal direction of the vehicle and the table top is fastened on the carrier by a table-top holder such that it can be pivoted about a pivot axis extending in the longitudinal direction of the vehicle out of its vertical, rest position into a horizontal position, and wherein the table top and/or the table-top holder can be arrested in the use position and the rest position by an arresting device, which is a latching device into which, with the table top located in the horizontal position and in the vertical position, the table-top holder can be latched, wherein the table-top holder with the table top located in the horizontal position and in the vertical position, is mounted in a displaceable manner in or counter to a direction of travel such that it can be latched into one of a plurality of latching recesses of the carrier, the latching recesses extending in or counter to the direction of travel, and is secured against pivoting about the pivot axis, wherein the table-top holder is biased toward the rest position and toward the use position along the pivot axis into one of the plurality of latching recesses.

2. The arrangement as claimed in claim 1, wherein the table top and/or the table-top holder can be arrested in the rest position by an arresting mechanism.

3. The arrangement as claimed in claim 1, wherein the table-top holder has a bearing lug with a bearing bore extending in the longitudinal direction of the vehicle and is mounted such that the table-top holder is pivotable on a bearing spindle which extends coaxially to the pivot axis and is arranged on the carrier.

4. The arrangement as claimed in claim 3, wherein the table-top holder is mounted such that the bearing bore of the table-top holder receives the bearing spindle.

5. The arrangement as claimed in claim 4, wherein the carrier comprises an inner recess, the bearing spindle extends axially through the inner recess, and the bearing lug of the table top holder projects through a radial opening of the carrier into the inner recess.

6. The arrangement as claimed in claim 1, wherein the table top is mounted on the table-top holder such that the table top can be rotated about a table-top axis of rotation extending at a right angle to the plane of the table top.

7. The arrangement as claimed in claim 1, wherein the table top comprises two table sub-tops, wherein a first table sub-top is arranged on the table-top holder and is connected along a longitudinal edge, by a hinge, to a longitudinal edge of the second table sub-top.

8. The arrangement as claimed in claim 1, wherein the carrier comprises an armrest having a rear end region, as seen in the direction of travel, arranged on a backrest of a vehicle seat such that it can be pivoted about an armrest spindle extending at a right angle to the longitudinal extent of the armrest.

9. An arrangement of a collapsible table in the interior of a motor vehicle, comprising a table top arranged on a vehicle-mounted carrier such that it can be transferred from a rest position, with an essentially vertically oriented table plane, into an essentially horizontally oriented, use position, wherein the carrier extends in the longitudinal direction of the vehicle and the table top is fastened on the carrier by a table-top holder such that it can be pivoted, about a pivot axis extending in the longitudinal direction of the vehicle, out of its vertical, rest position into a horizontal position, and wherein the table top and/or the table-top holder can be arrested in the use position by an arresting device, which is a latching device into which, with the table top located in the horizontal position and/or in the vertical position, the table-top holder can be latched, wherein the table-top holder with the table top located in a horizontal position and/or in a vertical position, is mounted in a displaceable manner in or counter to the direction of travel such that it can be latched into a latching recess of the carrier, this recess extending in or counter to the direction of travel, and is secured against pivoting about the pivot axis, wherein the carrier comprises an armrest having a rear end region, as seen in the direction of travel, arranged on a backrest of a vehicle seat such that it can be pivoted about an armrest spindle extending at a right angle to the longitudinal extent of the armrest, and wherein an inclination-adjusting shaft, which is mounted in a rotatable but axially non-displaceable manner, extends axially through an inner recess of the armrest, projects outward at a front end of the armrest, as seen in the direction of travel, and carries a rotary knob, wherein a back end of the inclination-adjusting shaft comprises an external thread that engages in an inclination-adjusting device to adjust the inclination of the armrest by rotating the rotating knob.

10. The arrangement as claimed in claim 9, wherein a bearing spindle and the inclination-adjusting shaft extend parallel to one another through the inner recess of the armrest.

11. The arrangement as claimed in claim 9, wherein a bearing bore of the table-top holder receives the inclination-adjusting shaft.

12. A collapsible table in a motor vehicle, comprising:
a vehicle-mounted carrier extending in a longitudinal direction of the motor vehicle;
a table-top holder arranged on the vehicle-mounted carrier, wherein the table-top holder is pivotable about a pivot axis extending in the longitudinal direction of the motor vehicle, out of a vertically oriented rest position into a horizontally oriented use position;
a table top fastened to the table-top holder, wherein the table top can be transferred from the rest position, with an essentially vertically oriented table plane, into the use position, with an essentially horizontally oriented table plane; and
a first latching recess and a second latching recess, wherein the table top and the table-top holder are arrested in the use position by the first latching recess of the vehicle-mounted carrier into which the table-top holder is latched and in the rest position by the second latching recess of the vehicle-mounted carrier into which the table-top holder is latched, wherein the table-top holder is mounted in an axially displaceable manner such that the table-top holder can latch into the first latching recess and the second latching recess of the vehicle-mounted carrier, wherein the first latching recess and the second latching recess extend in the longitudinal direction, and the table-top holder is secured against pivoting about the pivot axis via contact with the first latching recess in the use position and with the second latching recess in the rest position, wherein the table-top holder is biased toward the rest position and toward the use position along the pivot axis into the respective latching recess.

13. The collapsible table of claim 12, wherein the table-top holder is biased toward the rest postion and toward the use position via a pre-stressed spring.

14. The collapsible table of claim 12, wherein the table-top holder comprises a bearing lug with a bearing bore extending in the longitudinal direction of the vehicle, and the table-top holder is mounted such that the table-top holder pivots on a bearing spindle which extends coaxially to the pivot axis and is arranged on the carrier.

15. The collapsible table of claim 14, wherein the table-top holder is mounted—such that the bearing bore of the table-top holder receives the bearing spindle.

16. The collapsible table of claim 15, wherein the carrier comprises an inner recess, wherein the bearing spindle extends axially through the inner recess, and the bearing lug of the table top holder projects through a radial opening of the carrier into the inner recess.

17. The collapsible table of claim 12, wherein the table top is mounted on the table-top holder such that the table top is rotatable about a table-top axis of rotation extending at a right angle to the plane of the table top.

18. The collapsible table of claim 12, wherein the vehicle-mounted carrier comprises an armrest having a rear end region fastened to a backrest of a vehicle seat such that it is pivotable about an armrest spindle extending at a right angle to the longitudinal direction of the motor vehicle.

* * * * *